United States Patent [19]

Udren

[11] Patent Number: 4,528,611
[45] Date of Patent: Jul. 9, 1985

[54] RELAY FOR PILOT PROTECTION OF ELECTRICAL POWER LINES

[75] Inventor: Eric A. Udren, Monroeville, Pa.
[73] Assignee: Westinghouse Electric Corp., Pittsburgh, Pa.
[21] Appl. No.: 468,742
[22] Filed: Feb. 22, 1983
[51] Int. Cl.³ .............................................. H02H 3/18
[52] U.S. Cl. ...................................... 361/81; 361/68; 361/82; 361/64
[58] Field of Search ....................... 361/80, 81, 82, 66, 361/69, 62, 65, 75, 79, 63, 64, 68

[56] References Cited

U.S. PATENT DOCUMENTS

3,845,357 10/1974 Hagberg ................................. 361/80
4,408,246 10/1983 Ray ........................................ 361/62

Primary Examiner—A. D. Pellinen
Assistant Examiner—Hong Choe
Attorney, Agent, or Firm—William E. Zitelli

[57] ABSTRACT

New logic circuitry for a directional comparison blocking protective relay scheme. A forward-reaching and a reverse-reaching protective relay located at the local and remote terminals of a protected line segment determine whether a fault is internal or external to the protected line segment. To carry out this function, the protective relays produce signals representative of fault location and communicate with each other via a communications channel. A fault detector and logic circuitry is provided at each terminal for processing the produced signals to determine the fault location and avoid tripping when the fault character changes. By using fault detectors to determine the existence of a fault, the logic at each terminal for combining the signals is simplified and security against false tripping is improved.

21 Claims, 6 Drawing Figures

RELAY FOR PILOT PROTECTION OF ELECTRICAL POWER LINES

BACKGROUND OF THE INVENTION

1. Field of the Invention

This invention relates generally to protective relays and more specifically to protective relays for pilot protection of electrical power lines.

2. Description of the Prior Art

Electrical transmission lines and power generating equipment must be protected against insulation faults and consequent short circuits, which could cause collapse of the power system, serious and expensive apparatus damage, and personal injury. For instance, such a fault condition is caused by lightning-induced flashover from a transmission line to ground or between adjacent transmission line conductors. Under such a fault condition, line currents can increase to several times the normal value thereby causing loss of synchronism among generators and damaging or destroying both the transmission line and the attached equipment. To avoid equipment damage and collapse of the entire power system, faulted apparatus on the main transmission line must be isolated from the network in the range of 0.1 to 0.5 seconds. The isolation time limit must allow for the operation of large circuit breakers, interrupting up to 80,000 A, and the completion of back-up operations if these primary protective devices fail to function properly. To allow sufficient time for circuit interruption, location of the fault must be determined in approximately 8 ms to 20 ms. It is the function of the protective relays, which monitor ac voltages and currents, to locate line faults and initiate isolation via tripping of appropriate circuit breakers. These faults are located by determining the relationship of the ac voltages and currents.

One type of protective relay system for transmission lines employs a protective relay apparatus at each transmission line terminal. Using the ac voltages and currents, each protective relay operates independently to determine if a fault has occurred on the intervening protective line segment. This type of protective relay system usually provides high-speed simultaneous protection for only 70% to 80% of the faults in the middle section of the protected line. For faults occurring near the ends of the line, the protective relay nearest the fault clears the line at high speed. The relay remote from the fault, however, clears the line with a time delay unless system conditions provide high speed sequential tripping.

In another type of protective relay system, known as pilot relaying, the protective relays at each end of the transmission line communicate with each other via a bidirectional communication link. The relays at each line terminal compare fault location information to quickly determine if the fault is on the intervening line segment. If the comparison indicates that the detected fault is internal, i.e., between the two protective relays, the intervening transmission-line section is isolated by tripping the circuit breakers at the line terminals. If the comparison indicates the fault is not between the two protective relays, the circuit breakers remain closed and the line operative. Pilot protection provides high speed protection for 100% of the protected line independent of system conditions. The communications channel linking the two relays can employ a modulated carrier signal transmitted over a power line phase conductor or a microwave system, or audio tones propagated on a leased telephone line or a dedicated pilot wire.

There are several advantages to high speed simultaneous clearing at all terminals for all line faults, including: reduced possibility of line damage and conductor burn-down; improved transient stability of the power system, and provisions for use of high speed reclosing, which if successful, improves transient stability, minimizes outage time, and improves voltage conditions on portions of the system load.

There are many different types of pilot relaying; the present invention relates to a blocking pilot relaying system. In the blocking system, the communications channel linking the protective relays at opposite ends of the protected line segment is used only to prevent one or more of those protective relays from tripping on an external fault. A channel signal is not required for internal faults, i.e., tripping occurs in the absence of a channel signal. Therefore, when a channel signal is present, the pilot protective relays are blocked from tripping.

To detect a fault with a pilot relaying system, either directional comparison relays or phase comparison relays are used. In the directional comparison scheme, fault detecting relays compare the direction of power flow at the two line terminals. Power flow into the line at both terminals indicates an internal fault, and the circuit breakers at each terminal of the line are tripped. If the power flows into the line at one terminal and out at the other, the fault is external and the line remains in service.

The phase comparison scheme generally uses overcurrent fault detecting relays to compare, via the channel, the relative phase of the currents at the terminals. If the currents at the terminals are relatively in-phase an internal fault is indicated, and the circuit breakers at both terminals of the line are tripped. If the currents at the terminals are relatively 180° out-of-phase, an external fault (or through load current) is indicated and the breakers are not tripped.

Although the blocking schemes discussed briefly above are well-known in the prior art and have been used successfully for many years, they require specialized logic to suppress undesired trips that may result from the coordinated response of the protective relays to changes in fault character, e.g., clearing of an external fault. The digital logic and computer-based embodiments of the present invention take advantage of distinctive digital logic and software approaches to achieve more straightforward and easily coordinated behavior of the protective relays during a change in fault character. The present invention also reduces problems associated with coordination of relay operating times at the two terminals at the time of fault inception. The logic of the present invention can also be applied to conventional relays.

SUMMARY OF THE INVENTION

A relay for pilot protection of electrical power lines is disclosed. In a conventional digital logic embodiment of the present invention, the novel protective relay includes a fault detector, a reverse-reaching distance relay (commonly referred to as 21S/21NS), a forward-reaching distance relay (commonly referred to as 21P/21NP), and various digital logic components. The fault detector determines the existence of a fault and the reverse-reaching and forward-reaching distance relays determine the direction to the fault. The novel relay also receives signals from the associated circuit breaker indicating the status of the circuit breaker, and from a remote pilot relay indicating the remote pilot relay's determination as to the location of the fault. These signals are digitally processed and the relay trips the circuit breaker with which it is associated if the fault is on the protected line segment, or transmits a blocking signal to the remote pilot relay if the fault is external to the protected line segment. A software implementation of this concept is described in another embodiment of the invention.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

Figure 1:
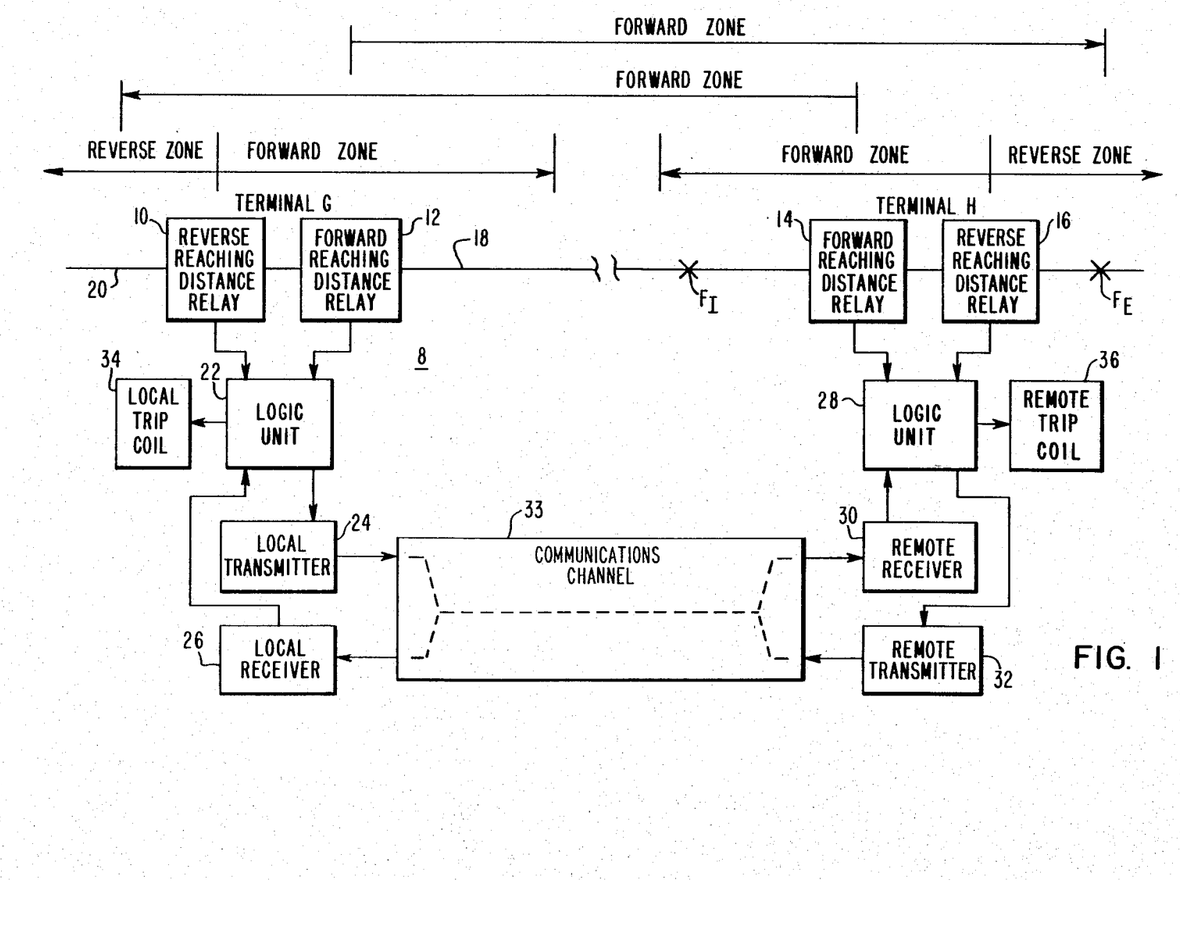
FIG. 1 is a block diagram of a pilot relaying system.

Turning to FIG. 1, there is illustrated a pilot relaying system 8, including the reach zones for each protective relay thereof located on an electrical power line 20. A reverse-reaching distance relay 10 and a forward-reaching distance relay 12 are located at a local terminal G of a protected line segment 18. A forward-reaching distance relay 14 and a reverse-reaching distance relay 16 are located at a remote terminal H of the protected line segment 18. (The forward zone refers to approximately 150% of the protected line segment 18, and the reverse zone refers to that portion of the electrical power line 20 behind the local terminal G or beyond the remote terminal H.) The forward-reaching distance relay 12 monitors that segment of the protected line segment 18 from the local terminal G beyond the remote terminal H; the far-reaching distance relay 14 monitors that segment of the protected line segment 18 from the remote terminal H beyond the local terminal G. The reach for each of the relays illustrated in FIG. 1 is indicated thereon by arrows for each relay.

A logic unit 22 is responsive to a signal from the reverse-reaching distance relay 10 and a signal from the forward-reaching distance relay 12. An input terminal of a local trip coil 34 is connected to a first output terminal of the logic unit 22. A local transmitter 24 is responsive to a signal from a second output terminal of the logic unit 22. A local receiver 26 provides a signal to the logic unit 22.

At the remote terminal H, a logic unit 28 is responsive to a signal from the reverse-reaching distance relay 16 and a signal from the forward-reaching distance relay 14. An input terminal of a remote trip coil 36 is connected to a first output terminal of the logic unit 28. A remote transmitter 32 is responsive to a signal from a second output terminal of the logic unit 28. A remote receiver 30 provides a signal to the logic unit 28. The local transmitter 24 communicates with the remote receiver 30 via a communications channel 33; the remote transmitter 32 communicates with the local receiver 26 via the communications channel 33.

For an external fault at a point $F_E$ in FIG. 1, operation of the pilot relaying system 8 is as follows. The forward-reaching distance relay 12 sees the fault and provides a signal to the logic unit 22 to prevent transmission of a blocking signal to the remote terminal H. The reverse-reaching distance relay 10 does not see the fault. At the remote terminal H, the forward-reaching distance relay 14 does not see the fault. The reverse-reaching distance relay 16 senses the fault and provides an appropriate signal to the logic unit 28. In response to a signal from the logic unit 28, the remote transmitter 32 transmits a blocking signal to the local receiver 26 via the communications channel 33. Upon receipt of the blocking signal, the local receiver 26 inhibits the logic unit 22 from tripping the circuit breaker (not shown in FIG. 1) at the local terminal G. In this situation, the protected line segment 18 remains in service because the fault is external.

For an internal fault, designated $F_I$ in FIG. 1, the forward-reaching distance relay 12 operates and provides a signal to the logic unit 22 to prevent transmission of a blocking signal to the remote terminal H. Depending on the precise location of the internal fault, the reverse-reaching distance relay 10 may also see the fault and operate. At the remote terminal H, the forward-reaching distance relay 14 also sees the fault and, in conjunction with the logic unit 28, prevents transmission of a blocking signal to the local terminal G. The reverse-reaching distance relay 16 may or may not see the fault depending on the precise location of the internal fault. Since blocking signals have not been received at either the local terminal G or the remote terminal H, the logic units 22 and 28 energize the local trip coil 34 and the remote trip coil 36, respectively, thereby causing the associated circuit breakers to open.

In the prior art, the logic units 22 and 28 of FIG. 1 require specialized logic to suppress undesirable trips caused by uncoordinated response of the protective relays at the local terminal G and the remote terminal H to changes in character of external faults. For instance, clearing an external fault may result in a sudden reversal of fault power through the protected line segment 18, particularly on parallel electrical transmission lines. With the directional comparison blocking system of FIG. 1 as constructed in the prior art, the protective relays at the end being blocked must reset before the blocking signal is removed. The opposite end must then transmit a blocking signal before the remote end protective relays operate. Also, high speed reclosing into a permanent external fault that originally caused a quick reversal of power can result in a second reversal. The present invention is designed to overcome these problems in the prior art directional comparison blocking schemes.

Figure 2:
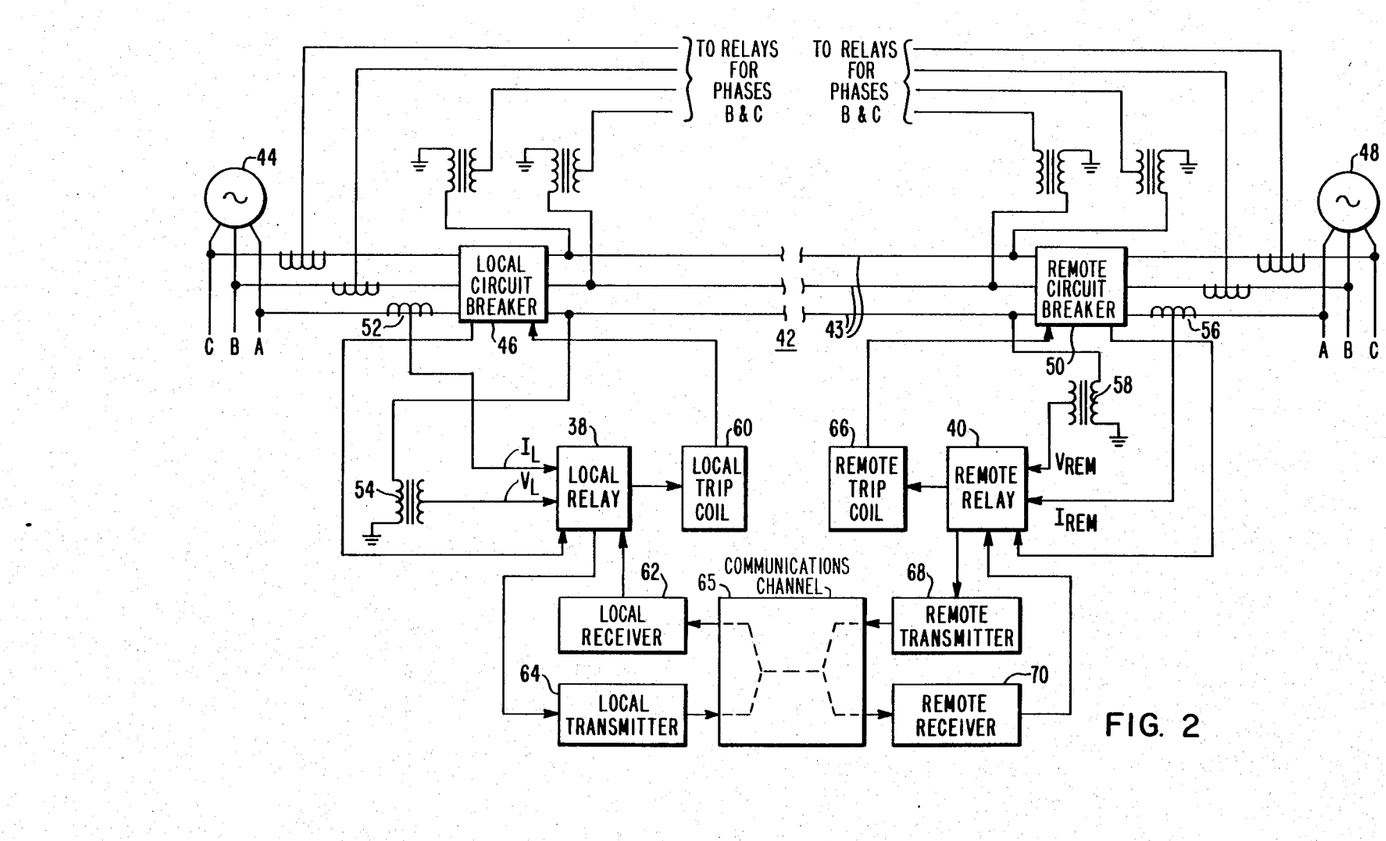
FIG. 2 is a partial block and partial schematic diagram of a pilot relaying system constructed according to the teachings of the present invention.

In FIG. 2, there is shown a partial block and partial schematic diagram of a directional comparison blocking scheme employing a local relay 38 and a remote relay 40 constructed according to the teachings of the present invention. A three-phase ac electrical power transmission line system 42 is protected by the local relay 38 and the remote relay 40. The three-phase ac electrical power transmission line system 42 includes a protected line segment 43 between the local relay 38 and the remote relay 40.

Specifically, the three-phase ac electrical power transmission line system 42 includes ac sources 44 and 48 for producing an ac electrical power signal having a frequency of 50 Hz or 60 Hz. The ac source 44 is connected to the three-phase ac electrical power transmission line system 42 via a local circuit breaker 46. The ac source 48 is connected to the three-phase ac electrical power transmission line system 42 via a remote circuit breaker 50. A current transformer 52 produces a signal $I_L$ that is representative of the current at the local terminal of the protected line segment 43. The local relay 38 is responsive to the signal $I_L$ at a first input terminal thereof. A voltage transformer 54 produces a signal $V_L$ that is representative of the voltage at the local terminal of the protected line segment 43. The local relay 38 is responsive to the signal $V_L$ at a second input terminal thereof. Similarly, at a first input terminal, the remote relay 40 is responsive to a signal $I_{REM}$ produced by a current transformer 56 and representative of the current flowing through the protected line segment 43 at the remote terminal. The remote relay 40 is also responsive to a signal $V_{REM}$ at a second input terminal thereof; the signal $V_{REM}$ is produced by a voltage transformer 58 and representative of the voltage at the remote terminal of the protected line segment 43.

When a fault is located on the protected line segment 43, the local relay 38, via a first output terminal, provides a trip signal to a local trip coil 60; the local trip coil 60 then opens the local circuit breaker 46. Additionally, the remote relay 40 produces a trip signal, at a first output terminal thereof, that is input to a remote trip coil 66 for opening the remote circuit breaker 50.

An input terminal of a local transmitter 64 is connected to a second output terminal of the local relay 38. The local transmitter 64 communicates with a remote receiver 70 located at the remote terminal of the protected line segment 43 via a communications channel 65. An output terminal of the remote receiver 70 is connected to a third input terminal of the remote relay 40. A second output terminal of the remote relay 40 is connected to an input terminal of a remote transmitter 68 for communicating with a local receiver 62 via the communication channel 65. An output terminal of the local receiver 62 is connected to a third input terminal of the local relay 38. As illustrated in FIG. 2, the communications channel is a shared channel. That is, the local transmitter 64 and the remote transmitter 68 can use the same frequency; if either is transmitting, both the local receiver 62 and the remote receiver 70 respond. Other types of communications channels, well-known in the art, can be used in lieu of the communications channel 65.

A fourth input terminal of the local relay 38 is responsive to a signal from the local circuit breaker 46 that is indicative of the status thereof. A fourth input terminal of the remote relay 40 is responsive to a signal from the remote circuit breaker 50 that is indicative of the status thereof.

Note that the three-phase ac electrical power transmission line system 42 illustrated in FIG. 2 includes two additional voltage transformers at the local terminal, similar in construction to the voltage transformer 54, and two additional voltage transformers at the remote terminal, similar in construction to the voltage transformer 58, for providing voltage signals to relays (not shown in FIG. 2) for protecting phase conductors B and C of the protected line segment 43. Alternatively, the local relay 38 and the remote relay 40 can be configured to protect all three phase conductors; in this embodiment the signals from all the local and remote voltage transformers would be input thereto. Also, there is shown in FIG. 2 two current transformers at the local terminal, similar in construction to the current transformer 52, and two current transformers at the remote terminal, similar in construction to the current transformer 56, for providing currents representative of the current on the protected line segment 43 to protective relays for protecting the B and C phase conductors. Again, if the local relay 38 and the remote relay 40 protect all three phase conductors, all the local and remote current signals would be input thereto.

Figure 3:
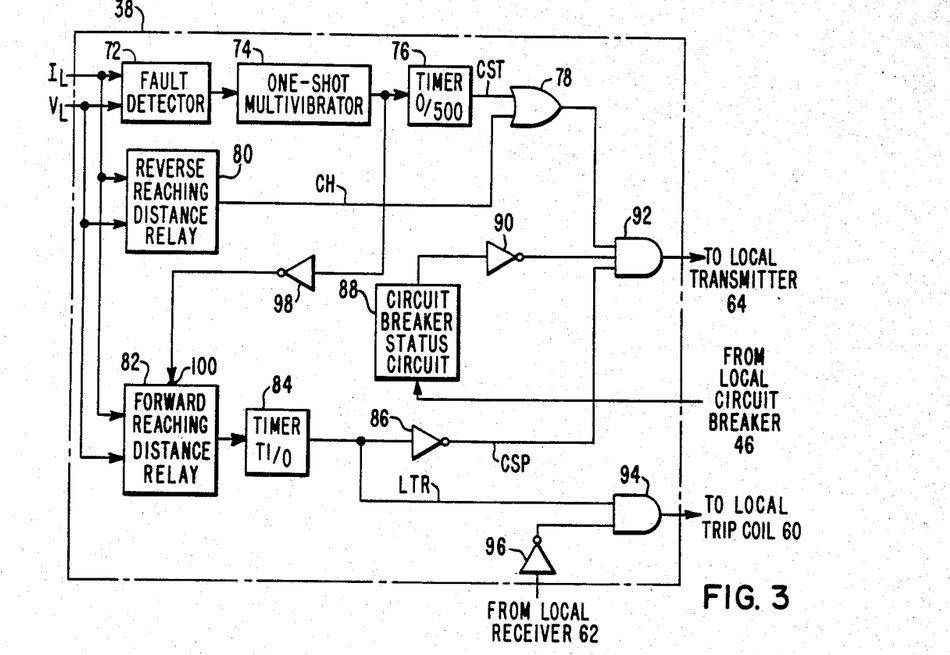
FIG. 3 is a partial block and partial schematic diagram of a digital logic embodiment of a protective relay constructed according to the teachings of the present invention.

Turning to FIG. 3, there is shown in partial block and partial schematic form, details of the local relay 38. The remote relay 40 is identical in function and construction to the local relay 38 and therefore will not be discussed further. The signal $I_L$ is input to a first input terminal of a fault detector 72. A second input terminal of the fault detector 72 is responsive to the signal $V_L$ from the voltage transformer 54 shown in FIG. 2. A one-shot multivibrator 74 is responsive to a signal from the fault detector 72. An input terminal of a timer 76 is connected to an output terminal of the one-shot multivibrator 74. An OR gate 78 has a first input terminal connected to an output terminal of the timer 76 and a second input terminal connected to an output terminal of a reverse-reaching distance relay 80. The reverse-reaching distance relay 80 is responsive to the signal $I_L$ at a first input terminal thereof and to the signal $V_L$ at a second input terminal thereof.

A forward-reaching distance relay 82 is responsive to the signal $I_L$ at a first input terminal thereof and to the signal $V_L$ at a second input terminal thereof. A timer 84 has a first input terminal connected to an output terminal of the forward-reaching distance relay 82. The timer 84 produces a local trip request signal designated LTR in FIG. 3. An input terminal of an inverting gate 86 and a first input terminal of an AND gate 94 are responsive to the signal LTR. The inverting gate 86 produces a signal CSP. A second input terminal of the AND gate 94 is responsive to a signal from the local receiver 62 (see FIG. 2) via an inverting gate 96. A first input terminal of an AND gate 92 is connected to an output terminal of the OR gate 78. A signal from the local circuit breaker 46 is input to an input terminal of a circuit breaker status circuit 88. An output terminal of the circuit breaker status circuit 88 is connected to a second input terminal of the AND gate 92 via an inverting gate 90. A third input terminal of the AND gate 92 is responsive to the signal CSP. The forward-reaching distance relay 82 includes a reset input terminal 100 connected to the output terminal of the one-shot multivibrator 74 via an inverting gate 98.

Operation of the local relay 38 is as follows. The fault detector 72 determines the existence of a fault by sensing sudden changes in current or changes in current and voltage waveforms. For sensitive detection of ground faults, the fault detector 72 can also employ a sensing circuit utilizing the residual current or voltage. When a disturbance is detected by the fault detector 72, the one-shot multivibrator 74 is triggered and the timer 76 goes high. The timer 76 has a pick-up time of zero seconds and a drop-out time of 500 ms. When the timer 76 goes high, it produces a carrier-start signal, designated CST, for input to the first input terminal of the OR gate 78. In response to the signals $I_L$ and $V_L$, the reverse-reaching distance relay 80 determines whether the fault is in the reverse zone. If the fault is in the reverse zone, the carrier hold output signal (designated CH) from the reverse-reaching distance relay 80 goes high. The signal CH is input to the second input terminal of the OR gate 78. The output terminal of the OR gate 78 is therefore high for 500 ms after the occurrence of a fault, and for a period beyond 500 ms, if the fault is determined to be in the reverse zone. If it is assumed that the output signals from the circuit breaker status circuit 88 and the timer 84 are low, the output terminal of the AND gate 92 is high, thereby activating the local transmitter 64. The local transmitter 64 then transmits a blocking signal to the remote receiver 70 for blocking tripping of the remote relay 40 of FIG. 2. Blocking of the remote relay 40 is necessary because although a fault has been detected by the fault detector 72, it has not yet been determined whether the fault is on the protected line segment 43.

The forward-reaching distance relay 82, in response to the signals $I_L$ and $V_L$ determines whether the fault is in the forward zone. If a forward fault has occurred, the forward-reaching distance relay 82 triggers the timer 84, and after a delay of T1, the timer 84 goes high. Under these conditions, the first input terminal of the AND gate 94 goes high. If a blocking signal is not received from the remote transmitter 68 of FIG. 2, the local receiver 62 produces a signal having a low state. The inverting gate 96 inverts this signal causing the second input terminal of the AND gate 94 to also go high. The high state of the output terminal of the AND gate 94 energizes the local trip coil 60 shown in FIG. 2 and thus opens the local circuit breaker 46. The pick-up time of the timer 84 (T1) is a coordinating delay set to allow sufficient time for the remote relay 40 to determine the location of the fault and, if required, send a blocking signal to the local relay 38. The pick-up time T1 must also allow for channel delay time between the local relay 38 and the remote relay 40.

When the forward-reaching distance relay 82 determines that the fault is in the forward zone, the high signal produced by the timer 84 is inverted by the inverting gate 86 to produce a carrier stop signal CSP. The signal CSP disables the AND gate 92. When the AND gate 92 is disabled, the local transmitter 64 is de-activated and does not produce a blocking signal for the remote relay 40. Now, if the remote relay 40 determines that the fault is in the forward zone, the remote relay 40 can open the remote circuit breaker 50. Also, the remote relay 40 does not transmit a blocking signal under these conditions, thus enabling the AND gate 94 and opening the local circuit breaker 46 after the coordinating delay T1 has elapsed.

The circuit breaker status circuit 88 receives the signal from the local circuit breaker 46, to determine the status of the contacts of the local circuit breaker 46. The circuit breaker status circuit 88 produces a signal having a low state when the contacts of the circuit breaker 46 are closed and a high state when the contacts are open. The circuit breaker status signal is inverted by the inverting gate 90. The low state of the circuit breaker status signal enables the AND gate 92. When the contacts of the local circuit breaker 46 are open, the circuit breaker status signal is high to disable the AND gate 92 and turn the local transmitter 64 off. The local transmitter 64 is turned off to allow the remote relay 40 to trip if it detects a fault. Such a fault obviously lies along the protected line segment 43.

Any further change in the signals $V_L$ or $I_L$ causes the fault detector 72 to retrigger the one-shot multivibrator 74, which resets the forward-reaching distance relay 82 through the inverting gate 98 and the reset input terminal 100. When reset, the forward-reaching distance relay 82 is in a fully-restrained state typical of non-fault conditions. The forward-reaching distance relay 82 therefore picks up again if the fault is still in the forward zone following any change that retriggers the fault detector 72.

The operating characteristics of the reverse-reaching distance relay 80 and the forward-reaching distance relay 82 provide mho circles or other conventional reach shapes. The logic of the local relay 38 is arranged to properly arbitrate the conventional overlap of the protective relay zones near the origin of the well-known resistance/reactance diagram.

Figure 4:
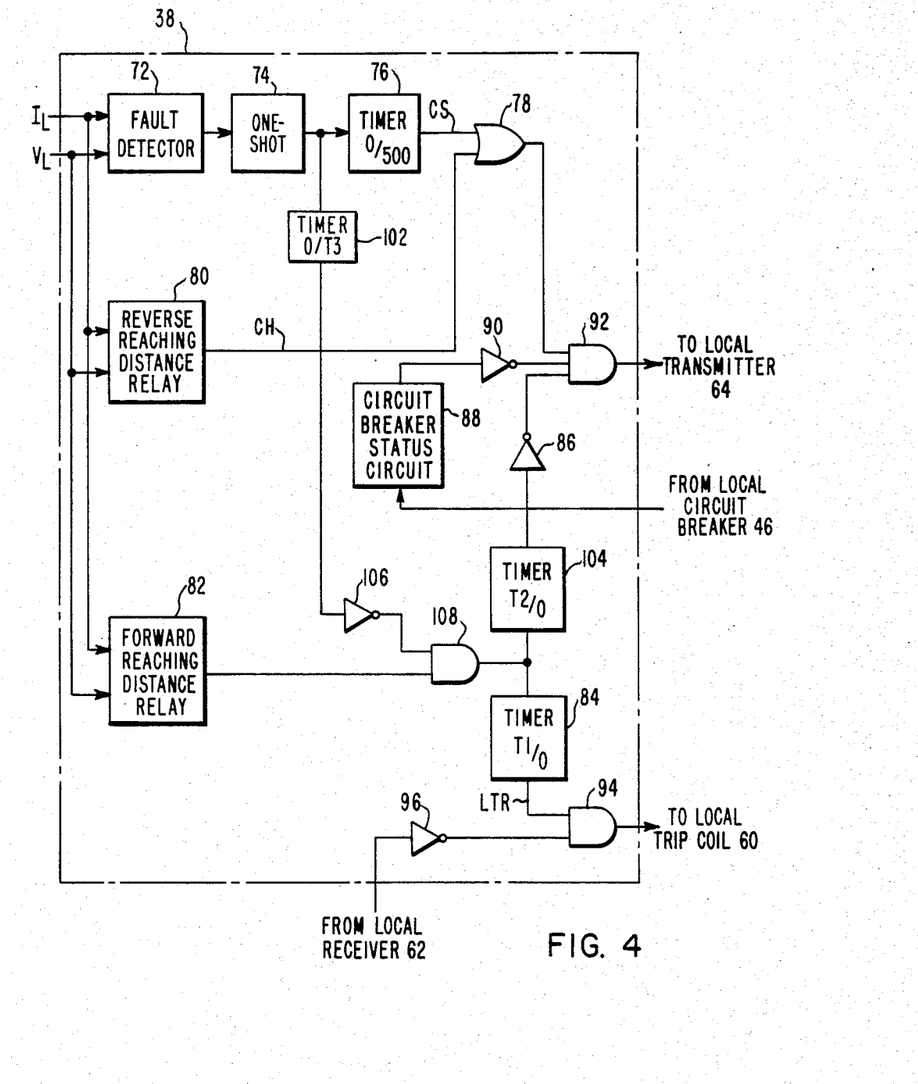
FIG. 4 is a second embodiment of a digital logic version of a protective relay constructed according to the teachings of the present invention.

In FIG. 4, there is shown a second embodiment of the local relay 38 for use when the forward-reaching distance relay 82 lacks a reset input terminal such as the reset input terminal 100 of FIG. 3. Also, the embodiment of FIG. 4 illustrates additional coordinating delays.

The components of FIG. 4 are identical in structure and function to the components bearing identical reference characters in FIG. 3. In FIG. 4, the output terminal of the one-shot multivibrator 74 is connected to an input terminal of a timer 102. An output terminal of the timer 102 is connected to a first input terminal of an AND gate 108 via an inverting gate 106. A second input terminal of the AND gate 108 is connected to the output terminal of the forward-reaching distance relay 82. An output terminal of the AND gate 108 is connected to an input terminal of a timer 104, and to the first input terminal of the AND gate 94 via the timer 84. An output terminal of the timer 104 is connected to the third input terminal of the AND gate 92 via the inverting gate 86.

In operation, the timer 102, the inverting gate 106, and the AND gate 108 block the output signal from the forward-reaching distance relay 82 long enough for the state of the forward-reaching distance relay 82 to re-stabilize in response to a fault change. The drop-out time (T3) of the timer 102 is established to provide sufficient restabilization time. After the forward-reaching distance relay 82 has had sufficient time to restabilize, the first input terminal of the AND gate 108 goes high to enable the AND gate 108 and the signal from the forward-reaching distance relay 82 is coupled through the AND gate 108 to the timer 84 as in the embodiment of FIG. 3.

The second coordinating delay added in FIG. 4 is due to the timer 104. The timer 104 holds the carrier on by enabling the AND gate 92 for a time T2 after the forward-reaching distance relay 82 has determined that the fault is in the forward zone. Neither of the coordinating delays associated with the timers 84 and 104 are necessary unless the remote relay 40 shown in FIG. 2 is of the conventional type. That is, the timers 84 and 104 are unnecessary if the remote relay 40 shown is identical in design to the local relay 38. In that situation, one timer, set for the longer of T1 and T2 is adequate.

Figure 5:
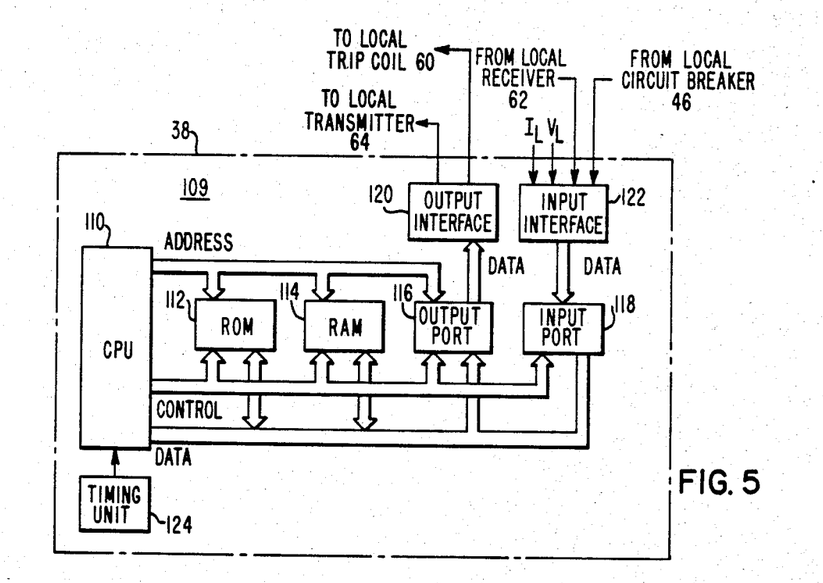
FIG. 5 is a block diagram of a computer-based embodiment of the present invention.

The local relay 38 can also be implemented by a digital computer, more specifically by a microcomputer. FIG. 5 is a block diagram of a microcomputer 109 that may be used. All of the functions of the local relay 38 discussed hereinbefore are implemented by the microcomputer 109.

Specifically, the microcomputer 109 includes a central processing unit (CPU) 110; a read-only meemory (ROM) 112; a random access memory (RAM) 114; a timing unit 124; an output port 116, for communicating with a suitable output interface 120, and an input port 118 for communicating with a suitable input interface 122. The output interface 120 sends appropriate signals to the local trip coil 60 and the local transmitter 64 as illustrated in FIG. 2. The input interface 122 receives the signals $I_L$ and $V_L$, and signals from the local receiver 62 and the local circuit breaker 46 as illustrated in FIG. 2. The CPU 110 communicates with the ROM 112, the RAM 114, and the output port 116 via an address bus shown in FIG. 5. Control is provided from the CPU 110, via the control bus, to the ROM 112, the RAM 114, the output port 116, and the input port 118. The ROM 112 communicates bidirectionally with the CPU 110 via the data bus; the RAM 114 also communicates bidirectionally with the CPU 110 via the data bus. Data from the CPU 110 is transmitted to the output interface 120 via the data bus and output port 116. Incoming data from the input interface 122 is conducted to the CPU 110 via the input port 118 and the data bus. The timing unit 124 provides appropriate timing signals to the CPU 110.

Figure 6:
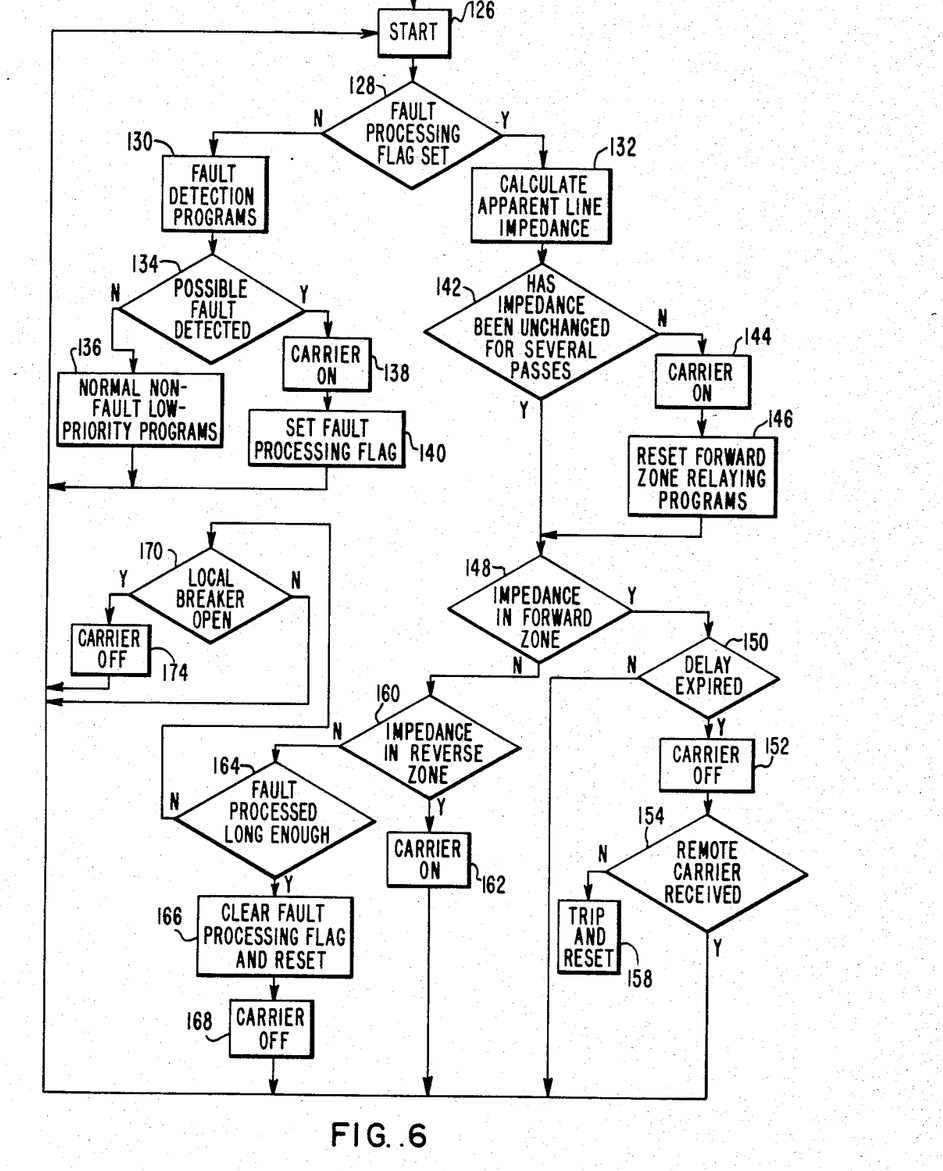
FIG. 6 is a software flowchart for the computer-based embodiment of FIG. 5.

Programming of the microcomputer 109 of FIG. 5 is illustrated by the software flowchart of FIG. 6. The software flowchart of FIG. 6 embodies an iterative concept wherein the ac waveforms and the various input signals to the input interface 122 of FIG. 5 are sampled a predetermined number of times per power cycle. This predetermined number can range from four to sixteen. For high-speed line protection twelve to sixteen samples should be taken per second, i.e., one every 1.0 to 1.4 ms. Each of the signals input to the input interface 122 is converted to digital format and input to the RAM 114 within the 1 to 1.4 ms sampling interval.

The microcomputer 109 then executes the loop software flowchart of FIG. 6 to process the new data together with older data stored on previous passes through the loop. Note that the microcomputer 109 must follow a closed path through the FIG. 6 flowchart every 1.0 to 1.4 ms. A number of conditions are checked on each pass through the loop, but processing does not stop to wait for any particular condition to occur. It should also be noted in FIG. 6 that provision is made for the microcomputer 109 to perform functions unrelated to protective relaying. To accomplish this, the software flowchart embodies a concept of fault-detector-trigger-protection program execution. Since processing of a line fault takes most or all of the time of the microcomputer 109, if it is desired to have the microcomputer 109 perform other functions during non-fault times, the microcomputer 109 must look at the data input thereto in only a cursory fashion. The microcomputer 109 seeks some evidence of a disturbance or possible disturbance using simple fault-detector programs. If a fault-detector program is triggered, the microcomputer 109 drops low priority jobs and begins an extensive array of fault classification and location programs.

At a start step 126 of the software program illustrated in FIG. 6, a new sample-set has been stored in the RAM 114 and is available for use. This occurs typically every 1.0 to 1.4 ms and triggers a run through the software program loop each time. At a step 128, the program determines whether a fault processing flag has been set. Setting of the flag indicates that a disturbance has occurred on a recent and previous pass through the software loop and that the program is in the middle of processing fault information. The flag is not set when there has been no recent disturbance and processing then moves to a step 130.

At the step 130, fault detection programs look for disturbances that might signify a fault. For example, the microcomputer 109 checks for signs of residual current, and also checks each phase current in search of substantial changes from one cycle to the next. Also, the residual voltage, and voltage changes on each phase can be similarly checked. At a decision step 134, the program determines whether a possible fault has been detected. If a disturbance is not seen, processing continues with on-going non-fault low-priority programs at a step 136. When the next set of sample data is available, processing moves from the step 136 to the start step 126.

If a possible fault was detected at the decision step 134, the local carrier is immediately turned on at a step 138 to block the remote relay 40 illustrated in FIG. 2. This is done to prevent the remote relay 40 from tripping until the local relay 38 determines the location of the fault. At a step 140, the fault processing flag is set and processing returns to the start step 126. Now, after the decision step 128 processing follows the affirmative branch and moves to a step 132.

At the step 132, the apparent line impedance is calculated to locate the fault with respect to a particular zone of protection. There are several prior art techniques for performing this calculation and more than one may be used simultaneously. At least one such technique utilizes a fairly fast-responding, short-window algorithm so that the succeeding step can be easily accomplished. At a decision step 142 it is determined whether the fault condition is stable, as indicated by reasonably consistent values of inductive reactance or impedance computed for several successive passes through the flow chart. In one embodiment of the present invention, reasonably consistent stability would be defined by variations of approximately 10% to 15%. If the present-result, as determined at the decision step 142, disagrees considerably with previous results, the carrier is turned on at a step 144 to block the remote relay 40 (i.e., if the carrier had been turned off in that part of the flowchart to be discussed below). At a step 146, the forward-reaching relay programs are reset so that the forward zone determinations start from an initial state. Forward zone reset is accomplished by restoring the initial prefault bias values in the integration counters for deciding if the impedance lies within the forward zone. Note that at the start of fault processing, the steps 144 and 146 have little effect, but become more important when the microcomputer 109 must properly handle the clearing of external faults.

At a decision step 148, the program determines whether the impedance lies within the forward zone. Note that the forward zone is used to request tripping of the local circuit breaker 46 (shown in FIG. 2) and to stop carrier transmission to the remote relay 40. At the decision step 148, an integration-counter evaluation is used so the impedance must fall within the forward zone on more than one pass through the program before the answer at the decision step 148 is affirmative. If the impedance is very close to the forward zone limit, many passes are required before a forward zone determination is made.

Assuming that several passes have been made through the program loop and that it has been concluded the fault is definitely within the forward zone. The program follows the affirmative branch from the decision step 148. At a decision step 150 a determination is made regarding whether a predetermined delay has expired. This delay is required only if the remote relay 40 is of a conventional type. If the delay has expired, processing moves to a step 152 where the carrier is turned off to allow the remote relay 40 to trip. The delay ensures that a conventional remote forward-reaching relay used at the remote terminal has dropped out for the case of a sequentially cleared external fault on a parallel line. The delay also delays the local trip request produced by the local relay 38 long enough for the remote reverse-reaching relay to start transmission of the carrier, also for the case of sequentially clearing of an external fault. In practice, this delay is set to the longer of these two times. Note that the delay is not required if the remote relay 40 utilizes the logic illustrated in FIGS. 3 or 4, or the software program of FIG. 6. In these embodiments, the necessary coordination is inherent in the design.

At this point, the importance of the decision step 142, wherein the impedance is checked to determine whether it has remained unchanged for several passes, can be seen. Any change in the fault character restarts carrier transmission that might have been turned off at the step 152. This occurs long before the remote relay 40 can pick up and false trip for the external-fault case where the remote relay 40 sees the apparent fault shift from out at the far end of the local forward zone to the local remote zone. In the case of the opposite apparent shift, the reset and restart of the local relay 38 (at the step 146) means that several more passes through the loop must occur before the fault is located within the forward zone. Meanwhile, an impedance-change detection program (i.e., as implemented at the decision step 142) in the remote relay 40 has also seen the fault shift and restarted carrier, so tripping of the local relay 38 is preempted.

Processing moves to a decision step 154 where the fault has been located in the forward zone, the coordinating delay (if used) has expired, and the carrier has been turned off. Now, if carrier is received from the remote end, the decision at the decision step 154 is affirmative and processing returns to the start step 126. Under these conditions, the remote relay 40 is indicating that either the fault is behind the remote terminal or is still being located. If no carrier is received, the local circuit breaker 46 is tripped and the fault processing flag and other program variables are reset at a step 158.

If the impedance check at the decision step 148 indicates that the fault is not within the forward zone, the decision at the decision step 148 is negative and processing moves to a decision step 160. The decision step 160 is encountered only when the program has not (or at least not yet) concluded that the fault lies within the forward zone. At the decision step 160, the program determines if the impedance indicates that the fault is in the reverse zone. If the fault is within the reverse zone, the decision at the decision step 160 is affirmative and the carrier is turned on at a step 162. The carrier must be turned on or maintained on at the step 162 because if the fault is found to lie in the reverse zone, the carrier must be on to keep the remote relay 40 blocked during the external fault. Otherwise, the programs for determining the apparent line impedance, and therefore the distance to the fault, eventually give up processing and turn the carrier off as will be seen below.

If the fault is within neither the forward nor reverse zones, the decision at the decision step 160 is negative and processing moves to a decision step 164. In the decision step 164, the program determines if the fault has been processed long enough (in one embodiment, several hundred milliseconds). If fault processing has been carried on for a sufficient time, the decision at the decision step 164 is positive, and the fault processing flag is cleared at a step 166. Also, the fault processing flag and other program variables are reset at the step 166. In effect, the program has concluded that the fault detectors were triggered by a switching event or by a fault so distant that it is of no local concern. The program also eventually arrives at the step 166 after clearing of an internal or a nearby external fault. At step 168, the carrier is turned off and processing continues to the start step 126.

If the apparent impedance does not place the fault in the forward or reverse zone, but the program has not checked long enough to ensure that there is no nearby fault, the decision at the decision step 164 is negative. Carrier transmission is sustained and therefore an open-breaker check is required for the situation where the three-phase ac electrical power transmission line 42 is energized only from the remote terminal. This check is made at a decision step 170 after a negative decision at the decision step 164. If the local circuit breaker 46 is open, processing moves to a step 174 where the carrier is turned off so that the remote relay 40 is allowed to trip if it sees a fault. Such a fault obviously lies along the protected line segment 43. If the local circuit breaker 46 is not open, processing returns to the start step 126. Note that the carrier remains on if the decision at the decision step 170 is negative. Without the decision step 170, transmission of the carrier from the local relay 38 would delay tripping of the remote relay 40 until the program at the local relay 38 gives up at the decision step 164; this might take several hundred milliseconds.

The discussion of the software flowchart illustrated in FIG. 6 is intended for purposes of illustration and not limitation. It is anticipated that alternative embodiments of the present invention may be conceived wherein the location of the instructions for identifying and locating the fault is different from that shown in the discussed flowchart. These alternative embodiments are believed to fall within the spirit and scope of the present invention as claimed hereinafter.

It should be noted that any of the embodiments of the present invention illustrated herein transmit a burst of carrier signal for most disturbances and external faults, whereas conventional prior art blocking configurations send carrier signals only for faults in the reverse zone. Such carrier bursts, occurring quite often, should increase confidence that the carrier equipment and the protective relays driving it are working properly.

What is claimed is:

1. A directional-comparison blocking protective relay located at a local end of a protected line segment of an ac electrical power network for opening a circuit interrupter means at the local end when a fault is detected on the protected line segment, wherein the fault is located by said directional-comparison blocking protective relay operating in communication with a remote protective relay located at a remote end of the protected line segment via a communications channel linking said directional-comparison blocking protective relay and the remote protective relay, and wherein the remote protective relay includes a remote receiver and a remote transmitter, and wherein the remote transmitter transmits a remote blocking signal to said directional-comparison blocking protective relay when a fault is detected in a reverse direction from the remote end, said directional-comparison blocking protective relay comprising:

current transformer means for producing a current signal representative of the current at the local end of the protected line segment;

voltage transformer means for producing a voltage signal representative of the voltage at the local end of the protected line segment;

fault detector means responsive to said current and said voltage signals for detecting the occurrence of a fault and for producing a fault signal in response thereto;

local transmitter means for producing a local blocking signal in response to said fault signal, wherein said local blocking signal is propagated over the communications channel to the remote receiver, and wherein said local blocking signal blocks the remote protective relay from tripping;

fault locator means responsive to said current and said voltage signals for producing a first signal if the fault is in the forward direction from the local end, and for producing a second signal if the fault is in the reverse direction from the local end, said fault locator means including means for producing a third signal if said fault locator means cannot determine the location of the fault after a predetermined time has elapsed, and for producing a fourth signal when said predetermined time has not elapsed and said fault locator means is still attempting to determine the fault location;

means responsive to said first signal for deactivating said local transmitter means such that said local transmitter means stops producing said local blocking signal thereby permitting said remote relay to trip if the remote relay determines that the fault is in the forward direction from the remote end;

means responsive to said third signal for deactivating said local transmitter means such that said local transmitter means stops producing said local blocking signal, and means responsive to said fourth signal for determining if the circuit interrupter means is open and for deactivating said local transmitter means if the circuit interrupter means is open, such that said local transmitter means stops producing said local blocking signal;

local receiver means responsive to the remote blocking signal for producing a received signal;

means responsive to said first signal and said received signal for producing a trip signal when said first signal is present and said received signal is not present;

wherein said trip signal opens the circuit interrupter means;

and wherein said local transmitter means produces said local blocking signal in response to said second signal for the duration of the fault.

2. The directional-comparison blocking protective relay of claim 1 wherein the fault locator means includes calculator means responsive to the current and the voltage signals for calculating a plurality of impedance values, wherein each one of said plurality of impedance values represents the instantaneous impedance of the transmission line and wherein each one of said plurality of impedance values is calculated using a predetermined number of samples of the current and the voltage signals, and for producing the first signal if said plurality of impedance values indicates the fault is in the forward direction from the local end, and for producing the second signal if said plurality of impedance values indicates that the fault is in the reverse direction from the local end, and for producing the third signal if after processing said predetermined number of samples of the current and the voltage signals said calculator means cannot determine the location of the fault, and for producing the fourth signal when said predetermined number of samples of the current and the voltage signals have not yet been processed.

3. The directional-comparison blocking protective relay of claim 2 wherein the calculator means produces a fifth sgnal if one of the plurality of impedance values differs by more than a predetermined limit from a previous one of the plurality of impedance values, and wherein said local transmitter means produces said local blocking signal in response to said fifth signal.

4. The directional-comparison blocking protective relay of claim 1 including inverter means responsive to the received signal for producing an inverted received signal, and wherein the means for producing the trip signal is an AND gate responsive to the first signal and the inverted received signal.

5. A directional comparison blocking protective relay located at a local end of a protected line segment fo an ac electrical power network for opening a circuit interrupter means at the local end when a fault is detected on the protected line segment, wherein the fault is located by said directional-comparison blocking protective relay operating in communication with a remote protective relay located at a remote end of the protected line segment via a communications channel linking said directional-comparison blocking protective relay and the remote protective relay, and wherein the remote protective relay includes a remote receiver and a remote transmitter, and wherein the remote transmitter transmits a remote blocking signal to said directional-comparison blocking protective relay when a fault is detected in a reverse direction from the remote end, said directional-comparison blocking protective relay comprising:

current transformer means for producing a current signal representative of the current at the local end of the protected line segment;

voltage transformer means for producing a voltage signal representative of the voltage at the local end of the protected line segment;

fault detector means responsive to said current and said voltage signals for detecting the occurrence of a fault and for producing a fault signal in response thereto;

one shot multivibrator means responsive to said fault signal for producing a multivibrator signal;

first timer means responsive to said multivibrator signal for producing a carrier start signal, said first timer means having predetermined pick-up and dropout times;

first distance relay means responsive to said current and said voltage signals for producing a carrier hold signal when the fault is in the reverse direction from the local end of the protected line segment;

OR gate means having a first input terminal responsive to said carrier start signal and a second input terminal responsive to said carrier hold signal for producing a carrier-on signal;

first inverter means responsive to said multivibrator signal for producing an inverted multivibrator signal;

second distance relay means having first and second data input terminals responsive, respectively, to said current and said voltage signals for producing a local trip signal when the fault is in the forward direction from the local end of the protected line segment, and having a reset input terminal responsive to said inverted multivibrator signal, said inverted multivibrator signal for resetting said second distance relay means to the pre-fault state thereof;

second timer means responsive to said local trip signal for producing a delayed local trip signal, said second timer means having predetermined pick-up and dropout times;

second inverter means responsive to said delayed local trip signal for producing an inverted delayed local trip signal;

means for determining the status of the circuit interrupter means and for producing a status signal in response thereto, said status signal having a first state when the circuit interrupter means is open and having a second state when the circuit interrupter means is closed;

third inverter means responsive to said status signal for producing an inverted status signal;

first AND gate means responsive to said carrier-on signal, said inverted delayed local trip signal, and said inverted status signal, for producing a transmit signal;

local transmitter means for producing a local blocking signal in response to said transmit signal, wherein said local blocking signal is propagated over the communications channel to the remote receiver, and wherein said local blocking signal blocks the remote protective relay from tripping;

local receiver means responsive to the remote blocking signal for producing a received signal;

fourth inverter means responsive to said received signal for producing an inverted received signal;

and second AND gate means responsive to said delayed local trip signal and said inverted received signal for producing an interrupt signal for tripping said directional-comparison blocking protective relay, thereby opening the circuit interrupter means.

6. The directional-comparison blocking protective relay of claim 5 wherein the pick-up time of the first timer means is zero seconds.

7. The directional-comparison blocking protective relay of claim 5 wherein the drop-out time of the first timer means is 500 milliseconds.

8. The directional-comparison blocking protective relay of claim 5 wherein the pick-up time of the second timer means is greater than the time for the remote protective relay to determine if the fault is in the reverse direction from the remote end, plus time for the remote blocking signal to propagate from the remote transmitter to the local receiver means.

9. The directional-comparison blocking protective relay of claim 5 wherein the drop-out time of the second timer means is zero seconds.

10. A directional-comparison blocking protective relay located at a local end of a protected line segment of an ac electrical power network for opening a circuit interrupter means at the local end when a fault is detected on the protected line segment, wherein the fault is located by said directional-comparison blocking protective relay operating in communication with a remote protective relay located at a remote end of the protected line segment via a communications channel linking said directional-comparison blocking protective relay and the remote protective relay and wherein the remote protective relay includes a remote receiver and a remote transmitter, and wherein the remote transmitter transmits a remote blocking signal to said directional-comparison blocking protective relay when a fault is detected in a reverse direction from the remote end, said directional-comparison blocking protective relay comprising:

current transformer means for producing a current signal representative of the current at the local end of the protected line segment;

voltage transformer means for producing a voltage signal representative of the voltage at the local end of the protected line segment;

fault detector means responsive to said current and said voltage signals for detecting the occurrence of a fault and for producing a fault signal in response thereto:

one-shot multivibrator means responsive to said fault signal for producing a multivibrator signal;

first timer means responsive to said multivibrator signal for producing a delayed multivibrator signal, said first timer means having predetermined pick-up and drop-out times;

second timer means responsive to said multivibrator signal for producing a carrier start signal, said second timer means having predetermined pick-up and drop-out times;

first distance relay means responsive to said current and said voltage signals for producing a carrier hold signal when the fault is in the reverse direction from the local end of the protected line segment;

OR gate means having a first input terminal responsive to said carrier start signal signal and a second input terminal responsive to said carrier hold signal for producing a carrier-on signal;

second distance relay means having first and second data input terminals responsive, respectively, to said current and said voltage signals for producing a local trip signal when the fault is in the forward direction from the local end of the protected line segment;

first inverter means responsive to said delayed multivibrator signal for producing an inverted delayed multivibrator signal;

first AND gate means responsive to said inverted delayed multivibrator signal and said local trip signal for producing a local trip request signal;

means for determining the status of the circuit interrupter means and for producing a status signal in response thereto, said status signal having a first state when the circuit interrupter means is open and having a second state when the circuit interrupter means is closed;

second inverter means responsive to said status signal for producing an inverted status signal;

third inverter means responsive to said local trip request signal for producing an inverted trip request signal;

second AND gate means responsive to said carrier-on signal, said inverted trip request signal, and said inverted status signal for producing a transmit signal;

local transmitter means for producing a local carrier signal in response to said transmit signal, wherein said local blocking signal is propagated over the communications channel to the remote receiver, and wherein said local blocking signal blocks the remote protective relay from tripping;

local receiver means responsive to the remote blocking signal for producing a received signal;

fourth inverter means responsive to said received signal for producing an inverted received signal;

and third AND gate means responsive to said local trip request signal and said inverted received signal for producing an interrupt signal for tripping said directional-comparison blocking protective relay, thereby opening the circuit interrupter means.

11. The directional-comparison blocking protective relay of claim 10 wherein the pick-up time of the first timer means is zero seconds.

12. The directional-comparison blocking protective relay of claim 10 wherein the drop-out time of the first timer means is greater than the time for the second distance relay means to restabilize after producing the local trip signal.

13. The directional-comparison blocking protective relay of claim 10 wherein the pick-up time of the second timer means is zero seconds.

14. The directional-comparison blocking protective relay of claim 10 wherein the drop-out time of the second timer means is 500 milliseconds.

15. The directional-comparison blocking protective relay of claim 10 including third timer means responsive to said local trip request signal for producing a first delayed local trip request signal, said third timer means having predetermined pick-up and drop-out times, wherein the third AND gate means is responsive to said first delayed local trip request signal.

16. The directional-comparison blocking protective relay of claim 15 wherein the pick-up time of the third timer means is greater than the time for the remote protective relay to determine if the fault is in the reverse direction from the remote end, plus time for the remote blocking signal to propagate from the remote protective relay to the local receiver means.

17. The directional-comparison blocking protective relay of claim 15 wherein the drop-out time of the third timer means is zero seconds.

18. The directional-comparison blocking protective relay of claim 15 including fourth timer means responsive to said local trip request signal for producing a second delayed local trip request signal, said fourth timer means having predetermined pick-up and drop-out times, wherein the third inverter means is responsive to said second delayed local trip request signal.

19. The directional-comparison blocking protective relay of claim 18 wherein the pick-up time of the fourth timer means is greater than the time for the remote protective relay to determine if the fault is in the reverse direction from the remote end, plus time for the remote blocking signal to propagate from the remote protective relay to the local receiver means.

20. The directional-comparison blocking protective relay of claim 18 wherein the drop-out time of the fourth timer means is zero seconds.

21. A protective relay system for opening a local circuit interrupter means and a remote circuit interrupter means of a protected line segment of an AC electrical power network, said protective relay system comprising:

remote current transformer means for producing a remote current signal representative of the current at the remote end of the protected line segment;

remote voltage transformer means for producing a remote voltage signal representative of the voltage at the remote end of the protected line segment;

remote fault detector means responsive to said remote current and said remote voltage signals for detecting the occurrence of a fault and for producing a remote fault signal in response thereto;

remote transmitter means for producing a remote blocking signal in response to said remote fault signal, wherein said remote blocking signal is communicated to the local terminal for blocking the local circuit interrupter means from tripping;

local current transformer means for producing a local current signal representative of the current at the local end of the protected line segment;

local voltage transformer means for producing a local voltage signal representative of the voltage at the local end of the protected line segment;

local fault detector means responsive to said local current and said local voltage signals for detecting the occurrence of a fault and for producing a local fault signal in response thereto;

local transmitter means for producing a local blocking signal in response to said local fault signal, wherein said local blocking signal is communicated to the remote terminal for blocking the remote circuit interrupter means from tripping;

remote fault locator means responsive to said remote current and said remote voltage signals for producing a first remote signal if the fault is in the forward direction from the remote end, and for producing a second remote signal if the fault is in the reverse direction from the remote end, and for producing a third remote signal if said remote fault locator means cannot determine the location of the fault after a predetermined time has elapsed, and for producing a fourth remote signal when said predetermined time has not elapsed and said remote fault locator means is still attempting to determine the fault location;

means responsive to said first remote signal for deactivating said remote transmitter means such that said remote transmitter means stops producing said remote blocking signal thereby permitting tripping of the local circuit interrupter means if the fault is in the forward direction from the local end;

remote receiver means responsive to said local blocking signal for producing a remote received signal;

means responsive to said first remote signal and said remote received signal for producing a remote trip signal when said first remote signal is present and said remote received signal is not present;

wherein said remote trip signal opens the remote circuit interrupter means;

wherein said remote transmitter means produces said remote blocking signal in response to said second remote signal for the duration of the fault;

means responsive to said third remote signal for deactivating said remote transmitter means such that said remote transmitter means stops producing said remote blocking signal;

means responsive to said fourth remote signal for determining if the remote circuit interrupter means is open and for deactivating said remote transmitter means if the remote circuit interrupter means is open, such that said remote transmitter means stops producing said remote blocking signal;

local fault locator means responsive to said local current and said local voltage signals for producing a first local signal if the fault is in the forward direction from the local end, and for producing a second local signal if the fault is in the reverse direction from the local end, and for producing a third local signal if said local fault locator means cannot determine the location of the fault after a predetermined time has elapsed, and for producing a fourth local signal when said predetermined time has not elapsed and said local fault locator means is still attempting to determine the fault location;

means responsive to said first local signal for deactivating said local transmitter means such that said local transmitter means stops producing said local blocking signal thereby permitting tripping of the remote circuit interrupter means if the fault is in the forward direction from the remote end;

local receiver means responsive to said remote blocking signal for producing a local received signal;

means responsive to said first local signal and said local received signal for producing a local trip signal when said first local signal is present and said local received signal is not present;

wherein said local trip signal opens the local circuit interrupter means;

wherein said local transmitter means produces said local blocking signal in response to said second local signal for the duration of the fault;

means responsive to said third local signal for deactivating said local transmitter means such that said local transmitter means stops producing said local blocking signal;

and means responsive to said fourth local signal for determining if the local circuit interrupter means is open and for deactivating said local transmitter means if the local circuit interrupter means is open, such that said local transmitter means stops producing said local blocking signal.

* * * * *